United States Patent [19]

Persson et al.

[11] 3,949,776

[45] Apr. 13, 1976

[54] DISK VALVE

[75] Inventors: Jan Persson; Ulf Sodergren, both of Finspong, Sweden

[73] Assignee: Stal-Laval Turbin AB, Finspong, Sweden

[22] Filed: July 25, 1974

[21] Appl. No.: 491,840

[30] Foreign Application Priority Data
Aug. 1, 1973 Sweden ............................ 7310583

[52] U.S. Cl. ................ 137/219; 251/31; 251/63.5
[51] Int. Cl.² ...................................... F16K 31/12
[58] Field of Search .......... 251/31, 219, 63.5, 63.6; 137/596.14, 596.15, 625.63

[56] References Cited
UNITED STATES PATENTS

| 537,593 | 4/1895 | Womersley | 251/31 |
|---|---|---|---|
| 2,474,304 | 6/1949 | Clancy | 251/31 |
| 2,585,556 | 2/1952 | Johnson, Jr. | 251/31 |
| 2,616,449 | 11/1952 | Maha | 251/31 |
| 2,631,907 | 3/1953 | Johnson, Jr. | 251/31 |
| 3,155,365 | 11/1964 | Hartung et al. | 251/31 |

*Primary Examiner*—Martin P. Schwadron
*Assistant Examiner*—George L. Walton
*Attorney, Agent, or Firm*—Eric Y. Munson

[57] ABSTRACT

A disk valve which may be rapidly closed through the action of the pressure of the working medium flowing therethrough includes pistons in cylinders on the upstream and downstream sides of the disk and channels for conveying the working medium pressure to the pistons to aid in opening and closing the valve. The channels may include valve means for conveying the pressure to and for venting it from the cylinders as well as a bore through the valve disk itself to connect the upstream side of the disk with the downstream cylinder.

4 Claims, 1 Drawing Figure

U.S. Patent   April 13, 1976   3,949,776
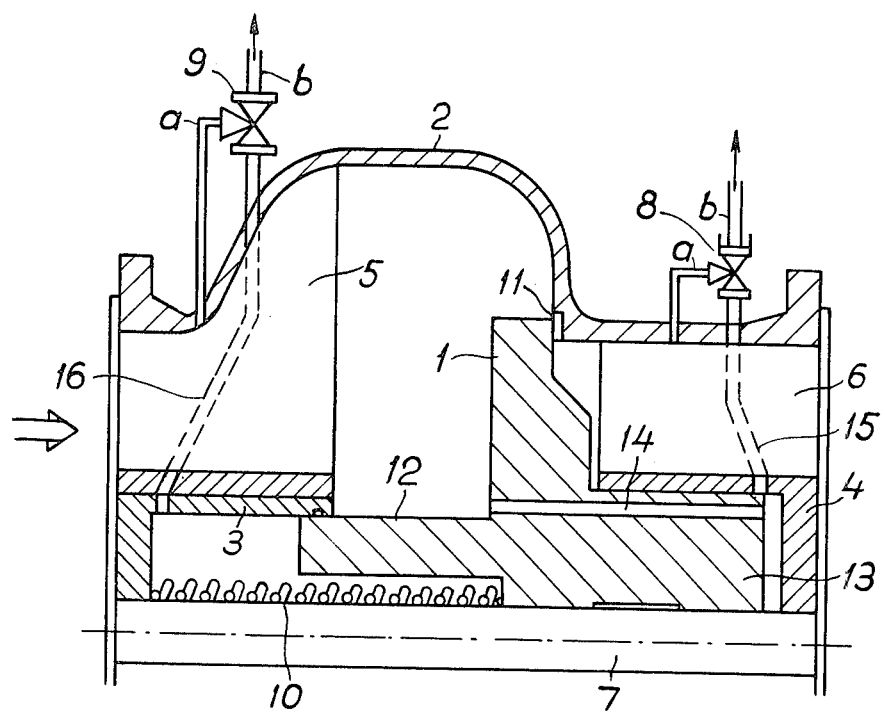

DISK VALVE

BACKGROUND OF THE INVENTION

The present invention relates to a disk valve comprising a valve housing or body with a seat for a valve disk which is movable in the axial direction of the valve. When the valve disk is being opened it moves against the direction of flow of the valve.

SUMMARY OF THE INVENTION

The invention relates to a valve which is operated by the pressure on the pressure side of the valve by means of central pistons positioned in corresponding stationary cylinders located on the two sides of the valve disk. For this purpose the valve is provided with channels and valves for conveying said pressure to the respective cylinders. In this manner a valve is obtained which can be operated in a very simple manner with the aid of the pressure of the working medium flowing in the valve and which can be rapidly closed.

BRIEF DESCRIPTION OF THE DRAWING

In other respects the invention will be described in greater detail with reference to the accompanying drawing which is a schematic view of an axial section through the center of a valve according to an embodiment of the invention. The passage of the flow in the valve is from the left to the right as indicated by the arrow.

DESCRIPTION OF A PREFERRED EMBODIMENT

The valve comprises a valve member including a valve disk 1 provided with pistons 12 and 13 which move in a valve housing or body 2 in the axial direction thereof. The disk seals against a valve seat 11 while on the upstream and downstream sides, i.e. on the inlet and outlet sides, of the disk, the central pistons 12 and 13 are positioned corresponding stationary cylinders 3 and 4. These cylinders are attached to the valve housing by means of arms or fins 5 and 6. The valve disk is provided with an axial bore passageway 14 and slides on a central bolt 7 which is fastened to the bottom of the cylinders 3 and 4. A helical spring 10 is threaded onto this central bolt between the bottom of the cylinder 3 at the upstream side of the valve disk. In the embodiment illustrated, the spring is positioned in a drill hole on the left-hand end of the piston 12.

Guiding of the valve disk and hence opening and closing of the valve is achieved by means of the pressure of the working medium on the upstream side of the disk 1 by adjusting the three-way valves 8 and 9. One of the connections of these three-way valves communicates by way of a radial drill passageway hole or channel 15 or 16 to the proper cylinder 4 or 3, respectively. A second connection a communicates with the corresponding space in the valve housing 2 above and below the disk 1, respectively. The connection b of the valves 8 and 9 leads to the atmosphere or some other suitable space having a lower pressure.

When it is desired to open the valve, the cylinder 3 is connected by way of the drill hole 16, the valve 9 and its connection b to the atmosphere or a corresponding area of lower pressure magnitude. Pressure from the upstream or pressure side of the valve disk 1 is permitted to pass through the axial drill hole or bore 14 in the valve disk to the cylinder 4, which, at the same time is connected to the valve space downstream by means of the drill hole 15, the valve 8 and the connection a. This causes a certain pressure equalization between the two sides of the valve disk causing the pressure in the cylinder 4 to overcome the spring force of the spring 10 so that the valve is opened.

As can be seen from the drawing, the pressure on piston 13 becomes equal to that on the left or upstream side of disk 1 and the pressure on the right or downstream side of disk 1 is a little lower than the pressure on piston 13 and on the left side of 1 because of the throttling effect of hole 15 and valve 8. As shown, the total area of piston 13 and the right side of disk 1 is greater than the area of the left side of disk 1, so that the pressure forces on the right side of the valve body will exceed those on the left side. Those skilled in the art will understand that the force of spring 10 should not exceed this pressure force difference and need only give an initial bias force.

Closing of the valve is performed by readjusting the valves 8 and 9 so that the cylinder 4 is unloaded through the discharge connection b on the valve 8, and the cylinder 3 is connected to the upstream or pressure side of the valve body 2 through connection a of the valve 9. Depending on how quickly the readjusting of the three-way valves is performed, the disk 1 will be pressed to the right with a certain speed so that the valve is closed. In this connection the bias force of spring 10 and the pressure in the cylinder 3 cooperates so that, when 8 and 9 are rapidly adjusted, the valve will act as a quick-closing valve.

The drill hole or channel 15 terminates in an opening in the cylinder 4 aapproximately slightly short of the end position of travel of the piston 14, in case of a closed valve, which means that a certain amount of overlapping occurs between the drill hole and the piston. Depending on the degree of this overlap, a certain dampening of the movement of the valve disk 1 is obtained immediately before total closing due to trapping of medium therein so that violent strokes in the valve are eliminated.

It can be seen from the drawing that during the closing operation a certain amount of leakage occurs through the valve, namely through the drill hole 14, the cylinder 4, the remaining opening in the drill hole 15, the valve 8 and its outlet b. This, however, is of minor importance since the valve 8 is intended to be shut off completely when the main valve is closed.

We claim:

1. In a disk-type valve including a valve housing having inlet and outlet passages, a valve disk operatively movable within the valve housing in the direction of flow of a medium through the valve, a valve seat against which the valve disk seats to block the flow and close the valve, the improvement enabling rapid closing of the valve through aiding action of the pressure of the medium flowing therein comprising:

a stationary cylinder located within the valve housing positioned downstream of the valve disk, a corresponding stationary cylinder located within the valve housing positioned upstream of the valve disk, a pair of pistons secured to the valve disk on either side thereof, each of the pistons moving in a respective one of the stationary cylinders, a passageway bore in the valve disk providing communication between the upstream side of the disk and the downstream cylinder, channel means for providing communication between the upstream side of the valve disk and the upstream cylinder and between the downstream side of the valve disk and the downstream cylinder the channel means including connection means connecting the cylinders and the upstream and downstream sides of the valve disk and an area of pressure magnitude less than that at the upstream side, and valve means operatively associated with the channel means for connecting a cylinder with its corresponding side of the valve disk or with the low pressure area.

2. The improved disk-type valve as claimed in claim 1 wherein the channel means providing communication between the downstream cylinder and the downstream side of the valve disk terminates in the cylinder slightly short of the cylinder end and overlaps with the piston therein to enable trapping of medium therein and a consequent dampening of piston and valve disk movement.

3. The improved disk-type valve as claimed in claim 1 wherein the valve disk is spring loaded in the direction of closing.

4. The improved disk-type valve as claimed in claim 1 where the valve means are three-way valves.

* * * * *